(12) United States Patent
Farris

(10) Patent No.: US 7,354,483 B2
(45) Date of Patent: Apr. 8, 2008

(54) DEVICE AND METHOD FOR TRANSPORTING AND DELIVERING LIQUID CHEMICAL TO INSIDE NATURAL GAS PIPELINE

(76) Inventor: Sam Farris, 129 Briarwood St., Oklahoma City, OK (US) 73160

(*) Notice: Subject to any disclaimer, the term of this patent is extended or adjusted under 35 U.S.C. 154(b) by 541 days.

(21) Appl. No.: 10/844,154

(22) Filed: May 12, 2004

(65) Prior Publication Data
US 2005/0115588 A1 Jun. 2, 2005

Related U.S. Application Data

(60) Provisional application No. 60/538,118, filed on Jan. 22, 2004, provisional application No. 60/525,160, filed on Nov. 28, 2003.

(51) Int. Cl.
*B08B 9/04* (2006.01)

(52) U.S. Cl. .................. 134/8; 134/22.12; 134/167 C; 134/168 C; 15/104.16

(58) Field of Classification Search .................... 134/8, 134/22.1, 22.12, 167 C, 168 C, 169 C; 15/104.061, 15/104.05, 104.16
See application file for complete search history.

(56) References Cited

U.S. PATENT DOCUMENTS

| 3,835,889 | A | * | 9/1974 | Hyde | 138/93 |
| 4,077,080 | A | * | 3/1978 | Ross | 15/104.061 |
| 4,590,799 | A | | 5/1986 | Brown et al. | |
| 4,767,603 | A | * | 8/1988 | Byrd et al. | 422/119 |
| 5,384,929 | A | | 1/1995 | Smith | |
| 6,500,271 | B1 | | 12/2002 | Moore et al. | |
| 6,755,916 | B1 | * | 6/2004 | Pruett | 134/8 |
| 2004/0025906 | A1 | * | 2/2004 | Bourrelly et al. | 134/8 |

* cited by examiner

*Primary Examiner*—Michael Barr
*Assistant Examiner*—Saeed Chaudhry
(74) *Attorney, Agent, or Firm*—R. William Graham

(57) ABSTRACT

A device for transporting and delivering chemical to interior walls of pipelines employs a pig having a tank which contains pressurized chemical therein. Operably connected to the tank is a nozzle which is equipped to deliver the chemical from the tank onto the inner pipeline walls as the pig is transported through the pipeline. The pig is equipped with a device to deliver the chemical at a predetermined point within the pipeline and includes a position tracking device to enable location thereof. A method of cleaning and treating a pipeline is also provided.

12 Claims, 2 Drawing Sheets

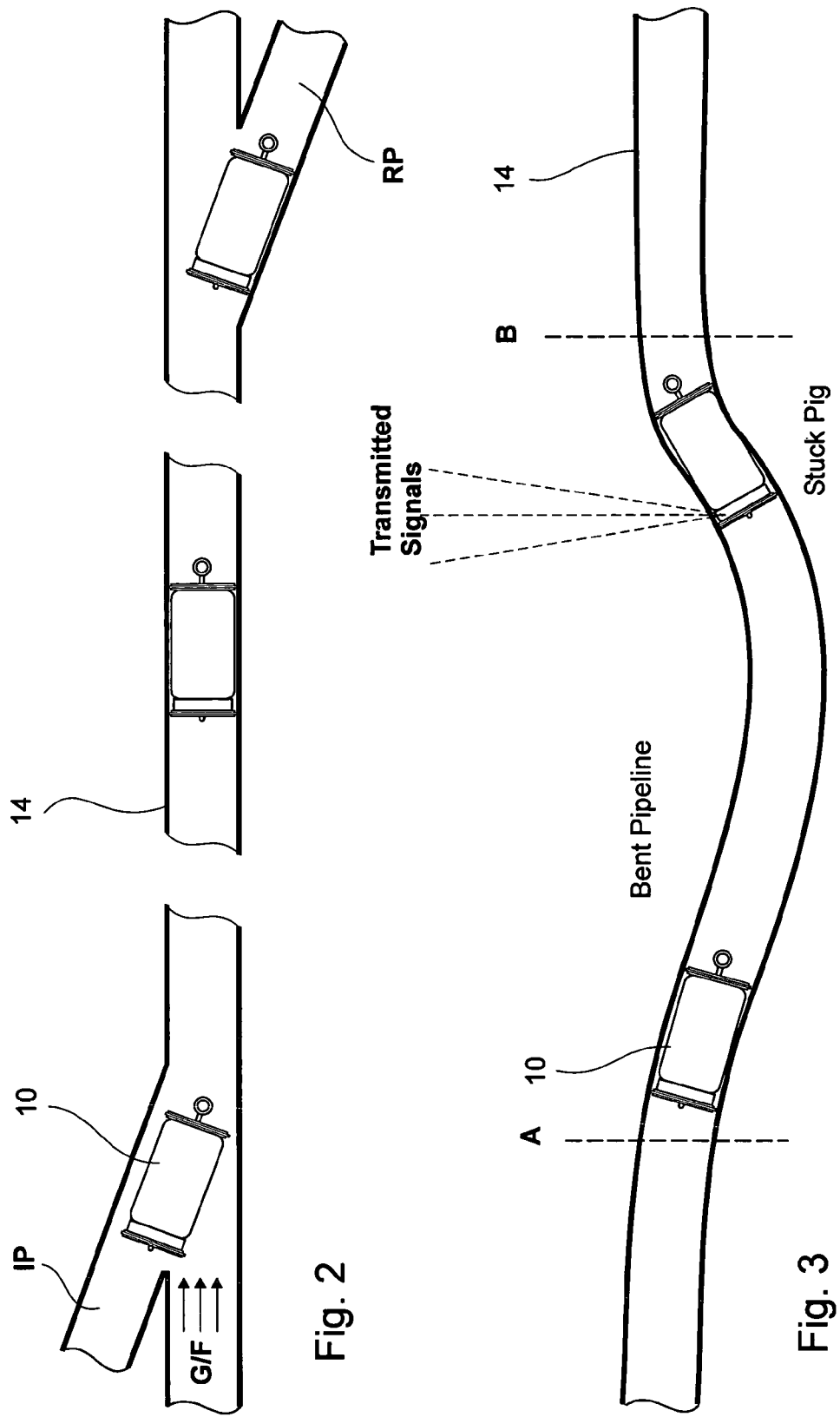

DEVICE AND METHOD FOR TRANSPORTING AND DELIVERING LIQUID CHEMICAL TO INSIDE NATURAL GAS PIPELINE

This is a continuation-in-part of U.S. Ser. No. 60/525,160 filed Nov. 28, 2003 and U.S. Ser. No. 60/538,118 filed Jan. 22, 2004.

BACKGROUND OF THE INVENTION

1. Field of the Invention

The present invention relates to the maintenance of natural gas pipelines. More particularly, the invention relates to a device and method for transporting and delivering chemical to interior walls of pipelines.

2. Description of the Prior Art

The interior surfaces of pipelines over time become corroded by either by oxidation or other chemical reaction, particularly if the pipeline is made of metal. This creates a serious potential risk in the rupture of the pipeline. Deleterious liquids and solids can build up in the interior of the pipeline preventing maximum fluid carrying potential of the pipeline as well as corrosion to the pipe.

Over the past century, a number of different techniques have been developed for cleaning the interior of pipelines. A common practice is therefore been to periodically clean the interior of the pipelines by passing cleaning device known in the art as a "pig" therethrough.

The pig is disposed in the interior of a pipeline and is moved by gas or fluid flow through the pipeline. The pig is constructed with an exterior structure to scrub the interior wall of the pipeline to scrape or brush the interior to dislodge solid materials. For example, one type of cleaning pig is known as a "foam pig" made out of plastic foam, such as polyurethane foam. This type of pig is durable and relatively inexpensive compared to pigs having metal or rigid plastic bodies. Pigs can have brush bristles that normally extend above the pig body for cleaning the inner pipeline walls. However, in some cases, the bristles scratch the interior surface of the pipeline. Such pigs are primarily are used for removal of debris through mechanical means and prone to lodging within the pipeline. Attempts to solve the lodging of pigs include ways of lubricating the exterior when stuck.

Still another pipeline cleaning technique is to provide a plurality of ports in the pipeline through which a spray nozzle may be inserted to emit cleaning/treating chemicals. The disadvantage of this type of technique is that the chemicals typically do not uniformly cover the inner walls due to the nozzle limitations, wherein typically a stream of chemicals is sprayed through pipeline with uneven application along the length thereof and such chemicals come to rest in the bottom of the pipeline. Also, this technique does not remove relatively larger solids from the inner walls as a pig may do.

There remains a significant need to improve the way in which pipelines are maintained. The prior techniques fail to provide an adequate solution to chemically and mechanically clean and treat inner walls of pipelines. The present invention overcomes the above mentioned problems with the art.

SUMMARY OF THE INVENTION

It is an object to improve pipeline cleaning.
It is another object to improve pipeline treatment.

It is an object to provide a pipeline pig which is economical to use.

It is another object of the invention to provide a pipeline pig which is easily located if it becomes stuck in a pipeline.

It is a further object of the invention to provide a pipeline pig which provides effective cleaning of the full perimeter of the interior walls of a pipeline.

It is a further object of the invention to provide a pipeline pig which provides effective chemical treatment of the full perimeter of the interior walls of a pipeline.

Still another object of the invention is to provide a pipeline pig which can be used in a variety of sizes of pipe.

An additional object of the invention is to provide a pipeline pig which can be used in a variety of types of pipes.

Still another object of the invention is to provide a pipeline pig which can deliver chemical to target areas within a pipeline.

Accordingly, the present invention is directed to a device for transporting and delivering chemical to interior walls of pipelines. The invention employs a pig having a tank which contains pressurized chemical therein. Operably connected to the tank is a nozzle which is equipped to deliver the chemical from the tank onto the inner pipeline walls as the pig is transported through the pipeline.

The pig can preferably be equipped with external wiper elements to mechanically clean debris from the inside of the pipeline. The pig can be equipped with a device to deliver the chemical at a predetermined point within the pipeline. Further, the pig can include a position tracking device to enable location thereof when the pig is lodged within the pipeline, thus enabling removal thereof. A method of cleaning and treating a pipeline is also provided.

These and other objects of the present invention will become readily apparent upon further review of the following specification and drawings.

BRIEF DESCRIPTION OF THE DRAWINGS

FIG. 2 is a schematic view of the invention disposed at various positions within a pipeline.
FIG. 3 is a view of the invention as it travels though a portion of a pipeline.

DETAILED DESCRIPTION OF THE PREFERRED EMBODIMENTS

Figure 1:
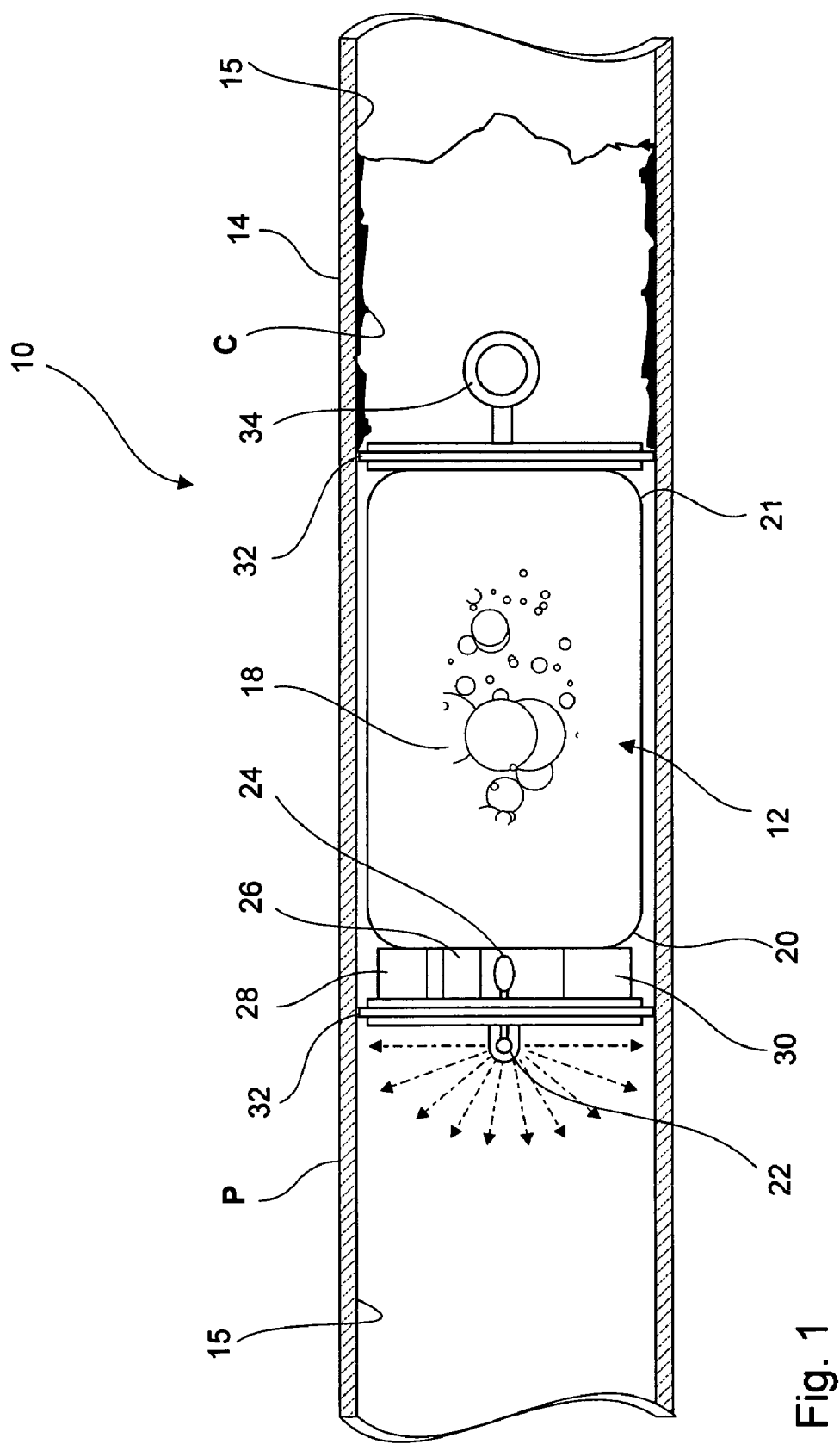
FIG. 1 is a sectional view of the invention.

Referring now to the drawings, the device for transporting and delivering chemical to interior walls of pipelines is generally represented by the numeral 10. The device 10 invention includes a tank 12 which can be generally cylindrical to facilitate transport through pipeline 14. The tank 12 contains a pressurized chemical 18 therein. The chemical can include solvents or surfactants known in the art and is under pressure with an inert gas. Operably connected to a trailing end 20 of the tank 12 is a spray nozzle 22. The nozzle 22 is equipped to deliver the chemical 18 from the tank 12 onto inner pipeline walls 15 as the device 10 is transported through the pipeline 14. The nozzle 22 can be an atomizer nozzle type which delivers a spray in a circumferential manner as shown to afford a distributed coating of the chemical 18 along the inner pipeline walls 15. It is contemplated that other positions for nozzle 22 on the tank 12 can be used.

An electric solenoid valve 24 operably connects the tank 12 and nozzle 22 and can be disposed in the trailing end 20. A sealed solenoid controller 26 is operably disposed in the trailing end 20 to control the actuation of the solenoid valve 24. The controller 26 can include a start/stop timer and or a computer based device which is programmed with software to open the solenoid valve 24 at a predetermined point A along the pipeline 14 proximate an area to be treated/cleaned and close the solenoid valve 24 at another point B proximate an area not needing treatment. A sealed power source 28, such as a battery, can also be operably disposed is the trailing end 20 to provide power to the controller 26 and enable actuation of the solenoid valve 24.

The device 10 can include a position tracking device 30. The device 30 can have an audible signal generating device and/or software in the controller 26 in the case of a computer based device which includes means for storing distance and time traveled, elevational changes, speed and interior pressure of the device 10 and for transmitting a signal of the location to enable retrieval of the device 10 if lodged within the pipeline.

The device 10 can also be equipped with external wiper elements 32 to mechanically clean debris from the inner pipeline walls 15. These wiper elements 32 can be disposed proximate the trailing end 20 and a leading end 21 of the tank 12. Also, connected to the leading end 21 of the tank 12 is an eye bolt 34, for example, which serves as a means for enabling the removal of the device 10 at a removal port RP within the pipeline 12.

The tank 12 can be made of a durable high pressure resistant material, such as metal or plastic. The wiper elements 32 can be made of a rigid material such as metal or plastic.

The device 10 is initially inserted into an inlet port IP where the device 10 has its leading end 21 disposed downstream. The device 10 travels through pipeline 12 and is propelled by gas/fluid G/F. When reaching an area to be treated at point A, the device 10 delivers the chemical 18. Also, the wiper elements 32 engage corrosive buildup C to remove the same. After passing by the point B, the device 10 shuts off the delivery of chemical 18. It will be evident to one skilled in the art that device 10 can also be equipped to treat entire lengths of the pipeline 12.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A device for transporting and delivering chemical to interior wall of a pipeline, which includes:
    a pipeline pig having tank being sealed with a solenoid controller having pressurized chemical therein for applying the interior wall of the pipeline, said tank of a size and configuration to be disposed within the pipeline in a manner to permit unlimited travel thereof throughout the pipeline;
    a leading end having a rigid wiper disposed thereat for engaging corrosive buildup and removing the same from the interior wall, said rigid wiper having an outer diameter approximately spanning an inner diameter of the pipeline;
    a trailing end having a wiper disposed thereat; and
    a nozzle operably connected to said tank, wherein said nozzle is equipped to deliver said chemical from said tank onto the interior wall of the pipeline adjacent said trailing end.

2. The device of claim 1, wherein said nozzle is connected to said tank to provide a circumferential spray pattern.

3. The device of claim 1, which includes a solenoid valve operatively interconnecting said tank and said nozzle.

4. The device of claim 3, which includes means for controlling said solenoid valve and the delivery of said chemical.

5. The device of claim 1, wherein said device includes an external wiper element connected thereto to mechanically clean debris from the interior wall of the pipeline as said device travels through said pipeline.

6. The device of claim 1, wherein said device includes means for delivering said chemical at a predetermined point within the pipeline.

7. The device of claim 1, wherein said device includes a position tracking device to enable location thereof within the pipeline.

8. The device of claim 1, wherein said device includes means for determining location of said device with respect to a predetermined point within the pipeline and delivering said chemical at said predetermined point within the pipeline.

9. A method of treating a pipeline, which includes the steps of:
    (a) disposing a pig having tank being sealed with a solenoid controller within the pipeline, said tank having pressurized chemical therein for treating the interior wall of the pipeline, said tank of a size and configuration to be disposed within the pipeline in a manner to permit unlimited travel thereof throughout the pipeline, said pig having a leading end having a rigid wiper disposed thereat for engaging corrosive buildup and removing the same from the interior wall, said rigid wiper having an outer diameter approximately spanning an inner diameter of the pipeline and a trailing end having a wiper disposed thereat and a nozzle operably connected to said tank, wherein said nozzle is equipped to deliver said chemical from said tank onto the interior wall of the pipeline adjacent said trailing end; and
    (b) causing the delivery of said chemical to occur while said pig is disposed in said pipeline.

10. The method of claim 9, wherein step (b) is further characterized such that said delivery occurs as said pig travels through said pipeline.

11. The method of claim 9, wherein step (a) is further characterized such that said pig includes means for tracking position thereof while disposed within said pipeline.

12. The method of claim 9, wherein step (a) is further characterized such that said pig includes means for tracking position thereof while disposed within said pipeline for determining location of said device with respect to a predetermined point within the pipeline and said step (b) is further characterized such that delivering said chemical is at said predetermined point within the pipeline.

* * * * *